(12) United States Patent
Graef

(10) Patent No.: US 6,501,577 B1
(45) Date of Patent: Dec. 31, 2002

(54) OPTICAL DATA BUS FOR A VEHICLE

(75) Inventor: Michael Graef, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/360,158

(22) Filed: Jul. 26, 1999

(30) Foreign Application Priority Data

Jul. 25, 1998 (DE) .......................................... 199 33 613

(51) Int. Cl.[7] .............................................. H04B 10/00
(52) U.S. Cl. ........................ 359/152; 359/142; 359/154
(58) Field of Search ................................ 359/152, 154, 359/142; 307/10.1

(56) References Cited

U.S. PATENT DOCUMENTS

| | | | |
|---|---|---|---|
| 4,879,762 A | 11/1989 | Hanyuda et al. ............. | 359/176 |
| 6,091,527 A | * 7/2000 | Brisse et al. ................. | 359/143 |
| 6,112,072 A | * 8/2000 | Stiegler et al. .............. | 455/343 |

FOREIGN PATENT DOCUMENTS

| | | |
|---|---|---|
| DE | 195 12 204 | 8/1995 |
| DE | 196 42 265 | 1/1998 |

* cited by examiner

*Primary Examiner*—Thomas Mullen
(74) *Attorney, Agent, or Firm*—Crowell & Moring LLP

(57) ABSTRACT

In an optical data bus for a vehicle with transmit/receive units (TRUs) that exchange data messages over optical connecting lines and are supplied with electrical energy, the receiving TRU can be deactivated to reduce energy consumption and then reactivated for a short time. The transmitting TRU emits a light pulse whose length is greater than the duration of its resting phase.

5 Claims, 1 Drawing Sheet

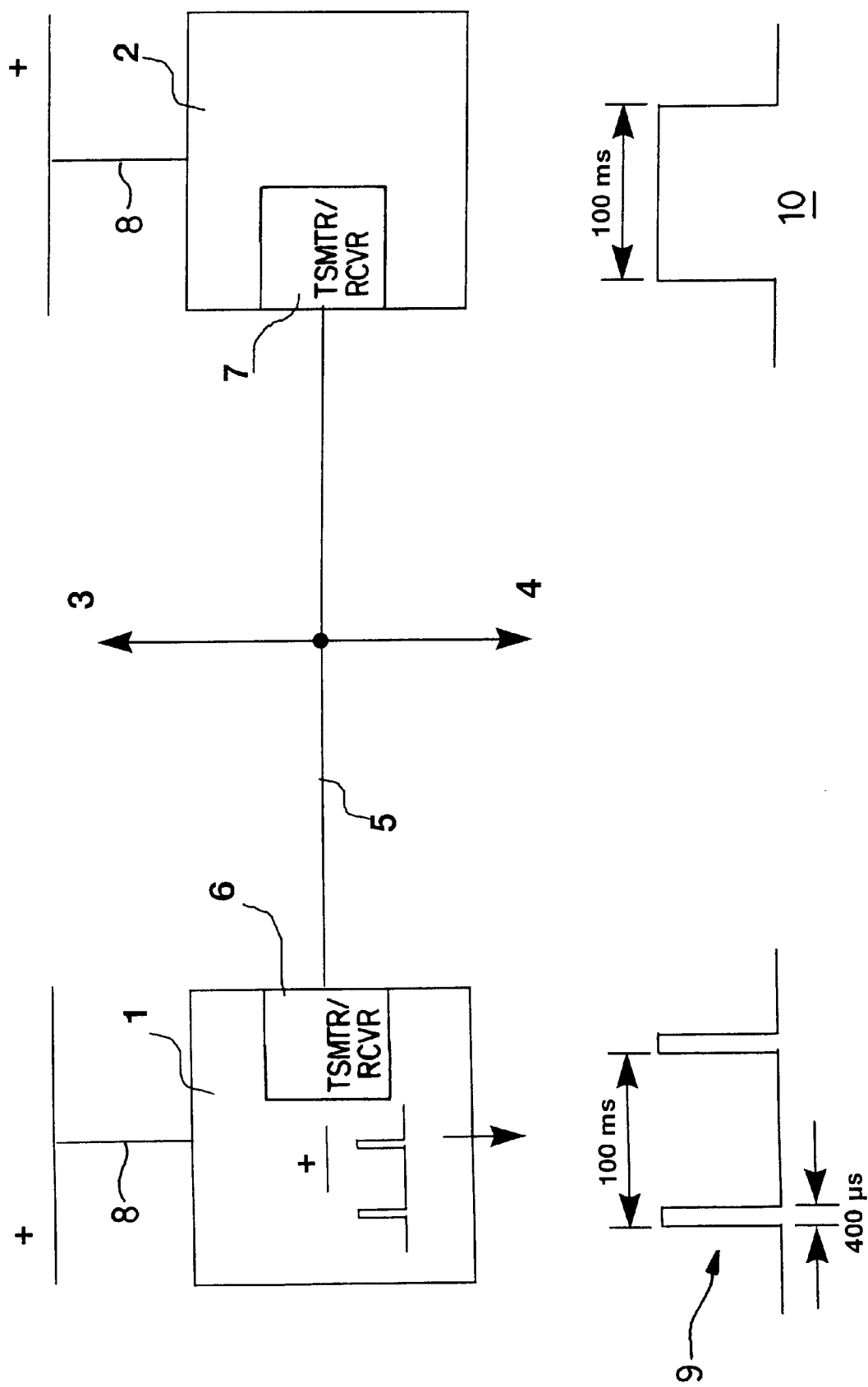

OPTICAL DATA BUS FOR A VEHICLE

BACKGROUND AND SUMMARY OF THE INVENTION

This application claims the priority of German Application No. 198 33 613.6, filed Jul. 25, 1998, the disclosure of which is expressly incorporated by reference herein.

The invention relates to an optical data bus for a vehicle with transmit/receiving units that exchange data messages over optical connecting lines and which are supplied with electrical energy.

Such data buses are becoming increasingly important in vehicles. Even when the vehicle is parked, the TRUs must be at least partially ready to receive. For this purpose, at least the optical receiver, a phototransistor for example, must be supplied with operating voltage. A current of several mA then flows. Added together, these currents, admittedly small individually, produce a high power draw through a large number of receivers when the vehicle is parked.

The goal of the invention is to provide a data bus of the type recited at the outset that has a low power draw when the vehicle is parked, but in which operating readiness is simultaneously guaranteed.

The invention achieves this goal by providing an optical data bus for a vehicle with transmit/receive units (TRUs) that exchange data messages over optical connecting lines and which are supplied with electrical energy. The invention is characterized in that the receiving TRU can be deactivated to reduce energy consumption and then reactivated for a short time. Further, the transmitting TRU emits a light pulse whose length is greater than the length of its resting phase.

The activation of the receiving units, each only for a short time, produces a definite reduction in the energy requirement. This requirement is only a fraction of that during continuous operation. The fraction is determined by the cycle ratio, in other words the ratio of the ON times to the OFF times. For example, if the cycle ratio is 1:1000, the power requirement is reduced practically to a thousandth, since the current draw of the electronic parts that produce the cyclic operation of the receiver is negligible in this technology.

The operational readiness of the data bus is ensured at all times. The individual TRUs are activated over the optical connecting lines. Additional or alternative activation by the electrical power supply is not necessary.

Advantageous embodiments of the invention are described herein. One of the problems which the invention overcomes concerns the time interval or frequency with which the individual TRUs are activated. One possibility is to activate the TRUs briefly at regular intervals. The advantage of this is that the transmitting TRUs each must emit only light pulses of a constant length.

On the other hand, a further reduction of the power consumption can be achieved when the resting phases are kept as long as possible. For example, they can depend on how long the vehicle has already been parked and can be lengthened in direct ratio to this time. This however creates the necessity for varying the length of the light pulses.

Other objects, advantages and novel features of the present invention will become apparent from the following detailed description of the invention when considered in conjunction with the accompanying drawings.

BRIEF DESCRIPTION OF THE DRAWING

The single FIGURE shows two TRUs with optical connecting lines that are parts of the data bus for a vehicle.

DETAILED DESCRIPTION OF THE DRAWING

In a vehicle, not shown, control units 1 and 2 and further indicated control units 3 and 4 are located. The control units 1–4 are connected by an optical data bus 5. Each control unit has transmit/receiver units 6 and 7 by which the control units exchange data messages (not shown). The control units and transmit/receive units 6 and 7 are supplied with electrical energy 8 from an energy source, not shown.

To reduce the power consumption of the transmit/receive units 6, 7, especially when the vehicle is parked, those units that do not have to operate continuously are supplied cyclically with electrical energy. The receiver of the unit, designed as a phototransistor, in this case assumed to be unit 6, is then activated cyclically. For example, this takes place with unit 6 being switched on at regular intervals with the vehicle parked. The unit 6 is switched on for 400 microseconds within each 100 millisecond interval (see timing diagram 9).

In order to actually be able in case of need to receive and process a light signal emitted by another control unit, this signal must be at least as long as the resting phase of 100 milliseconds. This is shown with the example of the corresponding control unit 2. When it wants to activate control unit 1, unit 7 transmits a light signal 10 with a length of 100 milliseconds. Unit 6, since it is ready to receive for 400 microseconds during this time, can process the light signal and turn on the control unit 2. This assumes, however, that control unit 2 is constantly activated, in other words even when the vehicle is parked.

Alternatively, it is also possible to operate control unit 2 with a lower power requirement. For this purpose, control unit 2 must be reached when necessary by a light signal that is longer than the resting phases of control unit 2 or unit 7. This can be performed for example, when the control device of a remote control in control unit 2 is involved, by the remote control signal having a length that is longer than the resting phases of control units 2. Control unit 2 thus can detect the information that a remote control signal has been delivered by a transmitter. It can then, in turn, awaken control unit 1 in the manner described.

Thus, it is possible to significantly reduce the power draw of control units and especially of transmit/receive units (6 and 7 in this case).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system for a vehicle, comprising:
   at least two transmit/receive units arranged in a vehicle;
   an optical data bus coupling the transmit/receive units, the transmit/receive units exchanging data messages over the optical data bus and being supplied with electrical energy;
   wherein a receiving transmit/receive unit is deactivatable in a resting phase to reduce energy consumption and then reactivatable for a short time duration, and wherein a transmitting transmit/receive unit emits a light pulse having a length greater than a length of the resting phase; and further wherein the resting phase increases in length based on a parking length of the vehicle.

2. The system according to claim 1, wherein the receiving transmit/receive unit is deactivatable automatically if a light pulse is not received during a defined time period longer than a length of the resting phase.

3. The system according to claim 1, wherein the resting phase increases in direct ratio to the parking length of the vehicle.

4. A process for optically communicating between transmit/receive units in a vehicle over an optical data bus, the process comprising the acts of:

supplying electrical energy to the transmit/receive units in the vehicle;

reducing the power consumption of the transmit/receive units by deactivating a receiving transmit/receive unit for a duration much longer than an activation time of said receiving transmit/receive unit, and operating a transmitting transmit/receive unit to emit a signal light pulse having a length greater than the activation and deactivation duration of the receiving transmit/receive unit; and varying at least the deactivation duration based on a parking duration length of the vehicle.

5. The process according to claim 4, wherein the act of varying at least the deactivation duration varies the deactivation duration in direct ratio to the parking duration length of the vehicle.

\* \* \* \* \*